May 15, 1945.   P. R. HIRSH   2,375,921
REINFORCED CONCRETE PIPE AND METHOD FOR MAKING SAME
Filed Dec. 2, 1942   4 Sheets-Sheet 1
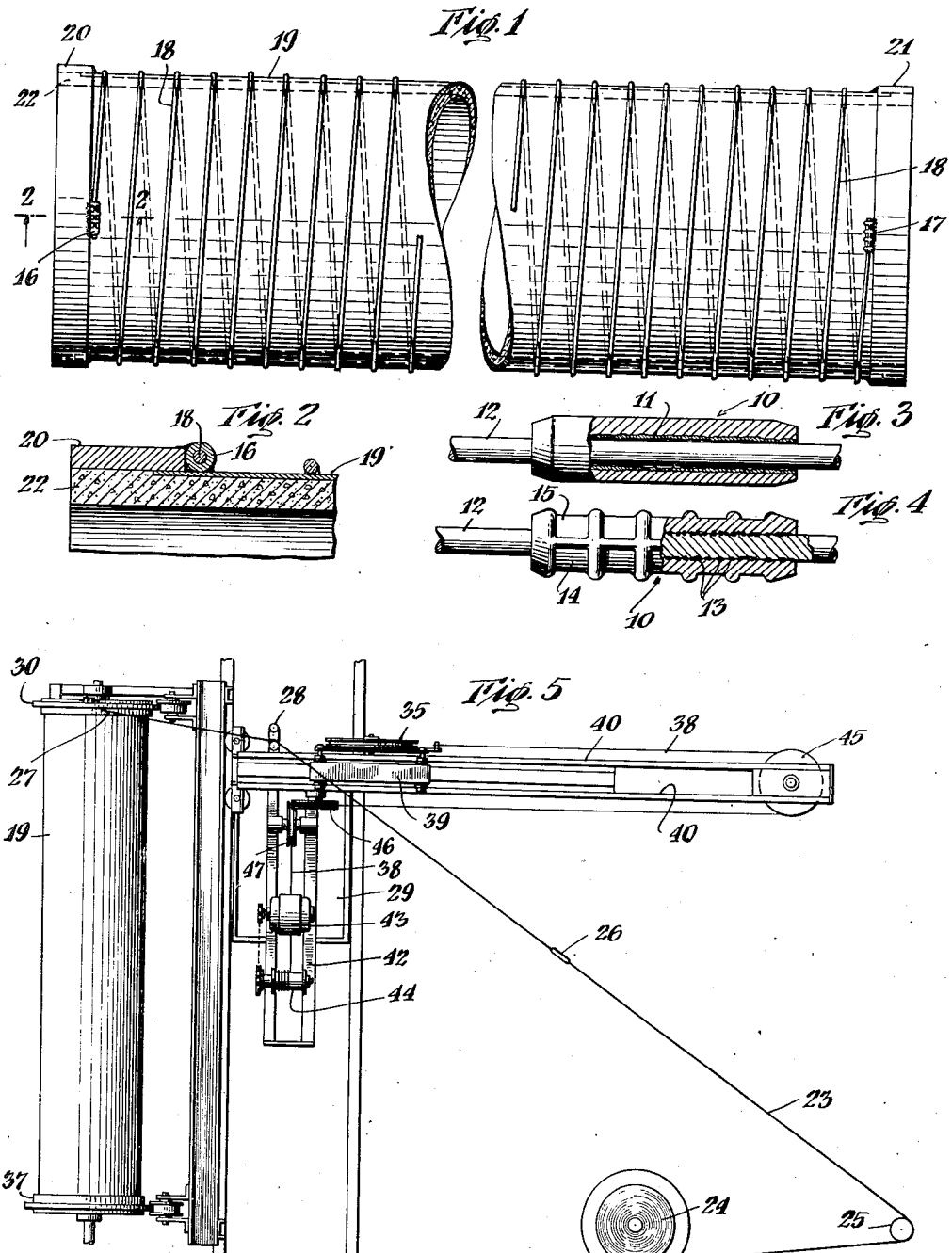
INVENTOR.
Philip R. Hirsh
BY
John C. Kerr
ATTORNEY

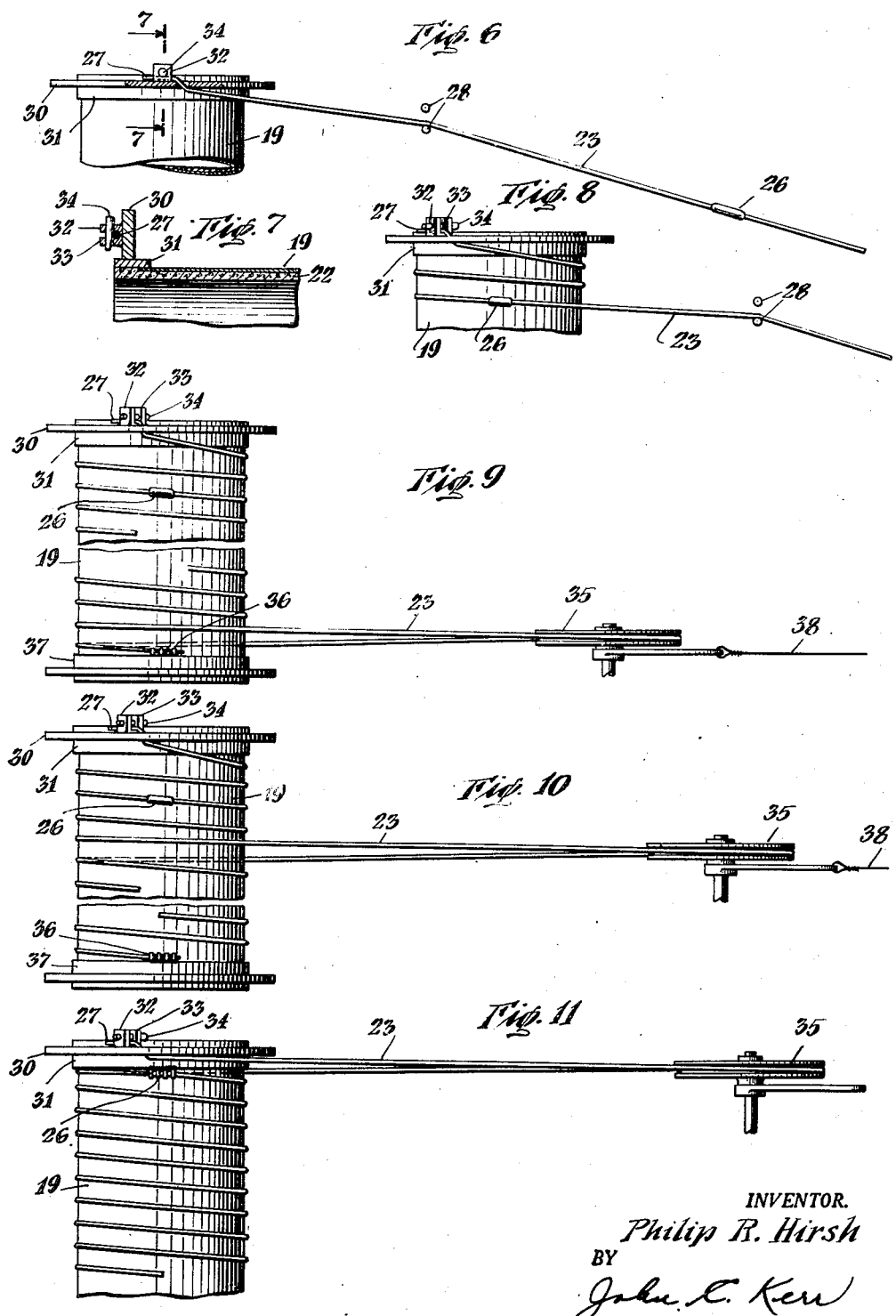

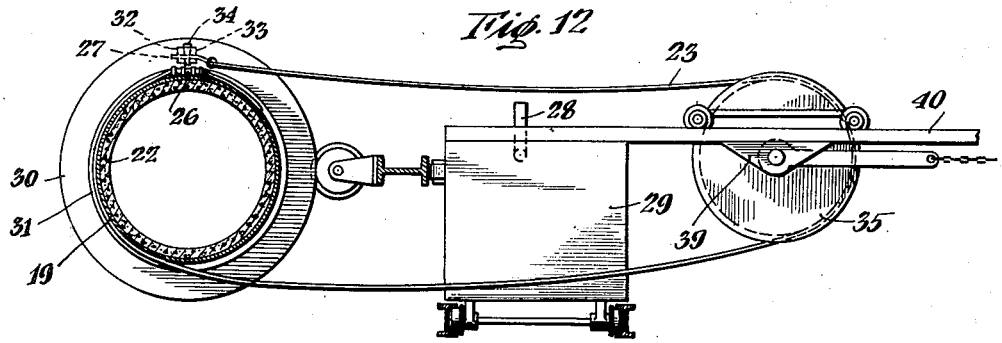
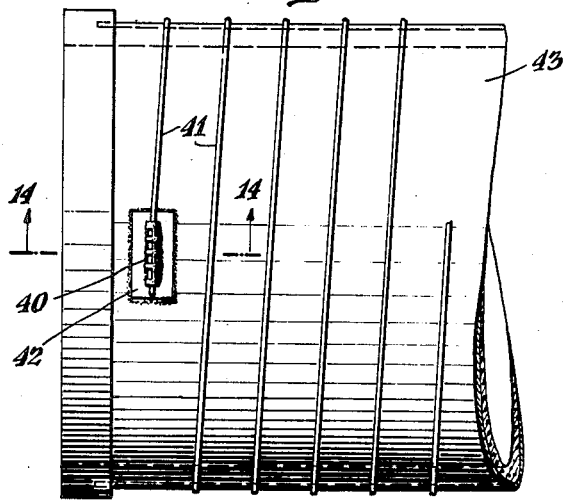
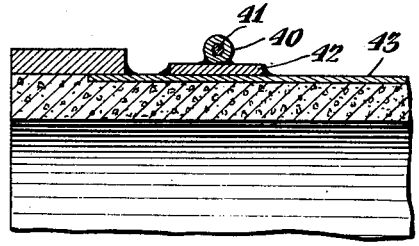
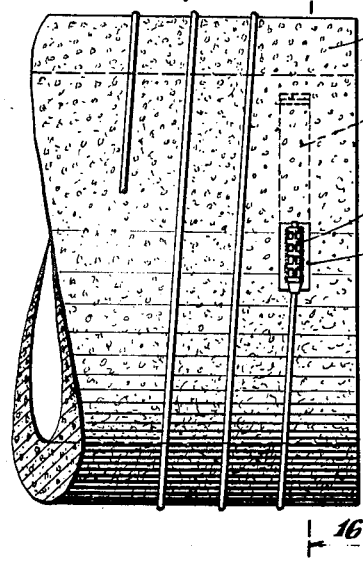
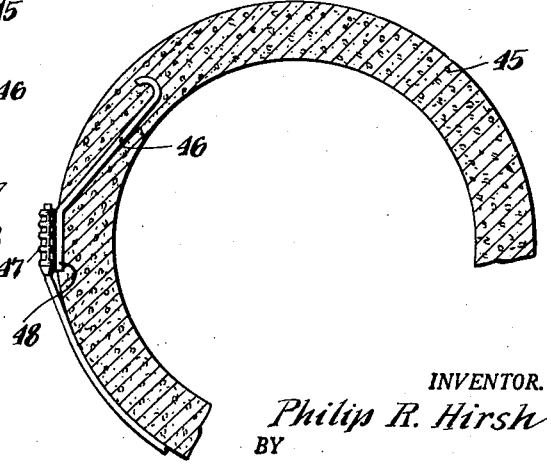

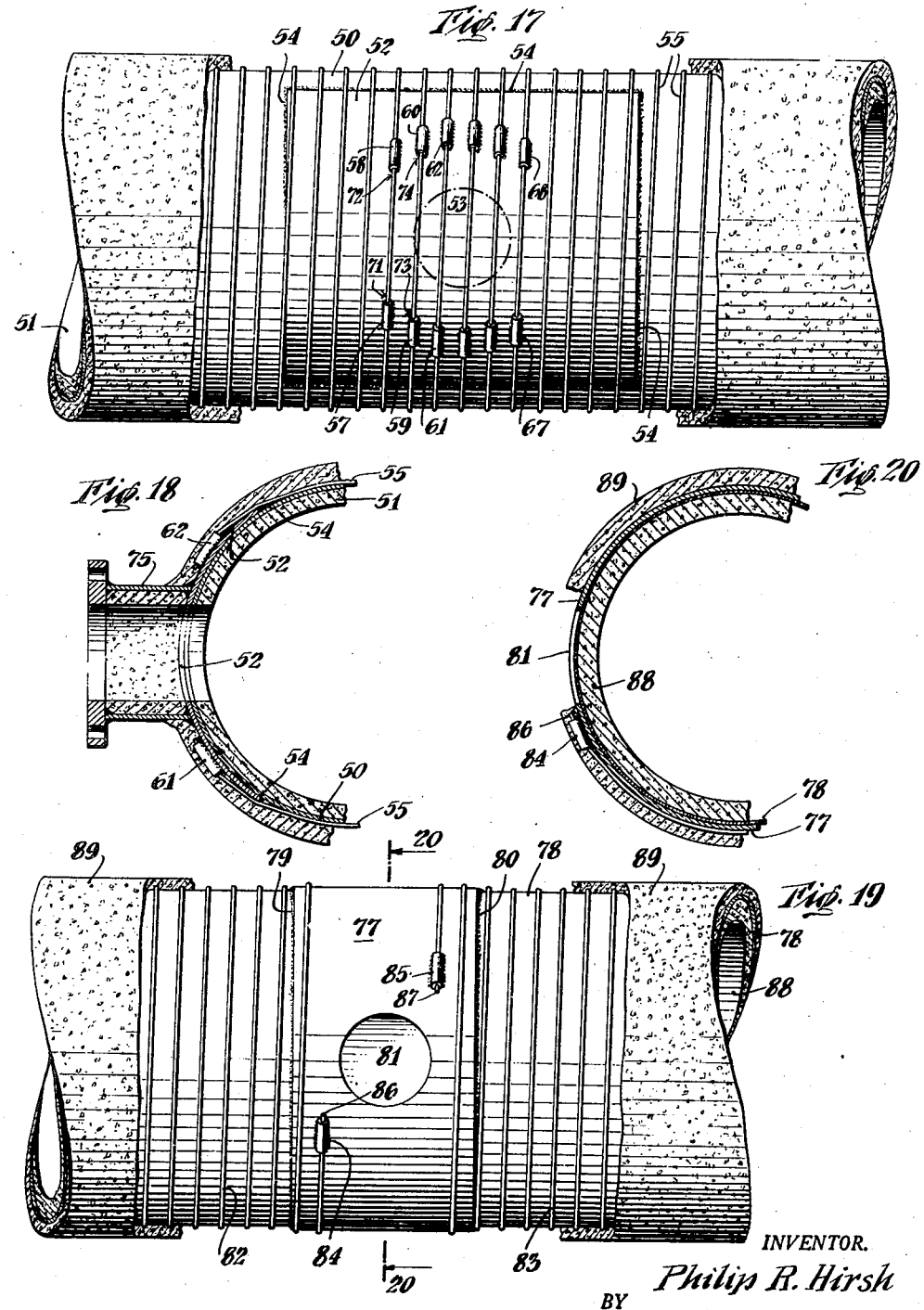

Patented May 15, 1945

2,375,921

UNITED STATES PATENT OFFICE 2,375,921

REINFORCED CONCRETE PIPE AND METHOD FOR MAKING SAME

Philip R. Hirsh, Verona, N. J., assignor to Lock Joint Pipe Company, East Orange, N. J., a corporation of New Jersey Application December 2, 1942, Serial No. 467,622

17 Claims. (Cl. 138—66)

This invention relates to reinforced concrete pipes.

One manner of making reinforced concrete pipes involves the laying of a tensioned wire winding about a core. Whether or not other reinforcing is employed in a concrete pipe, the winding contributes substantially to the strength of the pipe and higher bursting strengths can be obtained through its use. For pipes designed to withstand high internal pressures one practice is to employ a steel tube over and enclosing a cement or concrete pipe interior with a tensioned wire winding laid outside and against the outer surface of the steel tube. The metallic tube prevents leakage through the wall of the pipe should the cementitious lining become cracked. Usually steel end rings are employed to finish the ends of the pipe and provide joining members.

Among the objects of this invention is to provide a method and means by which reinforced concrete pipe can be more economically produced than heretofore, particularly in the range of pipes designed for withstanding high internal working pressures. In pipes designed to withstand high pressures savings in cost may be accomplished by lessening the amount of the steel reinforcement if the tension in the wire wrapping can be run up to a relatively high stress, but heretofore no economical means has been employed whereby the tensile capacity of a given wire can be utilized in a finished pipe. In prior procedures the tensioned wire winding has been anchored to the pipe or core by the use of mechanical devices, or by brazing or welding the wire to the steel tube. Mechanical devices are expensive or have a limited holding capacity. The heating of high tensile stress wire in welding it causes great loss in strength of the wire and therefore has the effect of lowering the testing limit and bursting strength of a pipe below that which should be expected for the tensile capacity of the wire used or for the tension applied to the wire as it is wound about the core.

In accordance with the method of the present invention the wire is locked or anchored to the core through the intermediary of a holding member or sleeve which securely grips the wire and is itself attached to the core by welding in a manner which avoids heating the wire to a softening point with attendant loss of strength of the tensioned wire and possible elongation thereof. The heat employed for the welding operation is localized, with the result that the wire may be highly tensioned when it is applied and its tension retained throughout the fabrication of the pipe. Because of this the ultimate bursting strength of the pipe can be accurately calculated beforehand with full assurance that no part of the pipe will be weakened from a manufacturing operation having to do with securing the wire to the pipe. A reinforced pipe of uniform strength throughout its length may be obtained.

Since the full original tensile strength of a given wire can be utilized and depended on for service in restraining internal pressure, pipes having a higher working or bursting strength can be fabricated than have heretofore been possible by the employment of wire of the same strength which has been softened by welding or brazing operations. Other objects and advantages will appear more fully in the accompanying specification and claims and in the following description in which I have described the principle of the invention and what I consider to be the best mode of employing the same.

With reference to the drawings:

Fig. 1 is a view of one form of reinforced concrete pipe employing the invention.

Fig. 2 is a detail of a wire anchorage on line 2—2 of Fig. 1.

Fig. 3 is a view of an anchoring or holding member placed loosely upon a wire.

Fig. 4 is a view of the anchoring member illustrated in Fig. 3 when compressed and in seizing relationship with the wire.

Fig. 5 is a plan of a wire winding machine.

Fig. 6 illustrates the relationship of the wire to a pipe core preliminary to initial winding.

Fig. 7 is a section on line 7—7 of Fig. 6, showing means for temporarily connecting the wire to the core.

Fig. 8 illustrates the approximate relationship of elements in the first stages of an initial winding operation.

Fig. 9 illustrates the relationship of the various elements at the beginning of the final winding or rewinding operation.

Fig. 10 illustrates the relationship of the various elements during the rewinding operation.

Fig. 11 illustrates the relationship of the various elements at the termination of the rewinding operation.

Fig. 12 illustrates the relationship of the various elements after the rewinding operation and when the permanent or final wrapping has been secured.

Fig. 13 illustrates an alternative manner of anchoring a wire which is suitable for securing the wire to a relatively thin tube.

Fig. 14 is a section on line 14—14 of Fig. 13.

Fig. 15 illustrates a manner of anchoring a wire to a core of concrete.

Fig. 16 is a section on line 16—16 of Fig. 15.

Fig. 17 shows a wrapping in the mid-portion of a pipe and provision for an outlet.

Fig. 18 is a section through a finished outlet.

Fig. 19 shows another wire-wrapped pipe with provisions for an outlet.

Fig. 20 is a section on line 20—20 of Fig. 19.

In Fig. 1 I have illustrated a pipe employing the invention. In this pipe the wrapping wire is uniformly tensioned throughout its length and its stressed condition is the same as it possessed when being applied. Since the tensile stress in the wire is known, the stresses in the different materials of which the pipe is made can be computed for different loads or internal fluid pressures.

A welded connection has sufficient strength and permanency for anchoring a tensioned wire wrapping, but inasmuch as it is desired to know the actual tensile strength obtaining in the wire wrapping within a finished pipe, welding of the wire is not suitable because the welding heat softens the wire and reduces its tensile strength. If heavy wire is employed to compensate for the loss in strength caused by heating, it is apparent that the cost will be increased, and there always remains the uncertainty of the strength of the wire adjacent welded points.

In the present invention, holding members or sleeves are permanently engaged to the wire and these are wastened to the core. The holding member is preferably in the form of a soft or mild steel sleeve 10, Fig. 3, which has a layer of gripping material 11 in its bore. A sleeve should be selected which can be slid onto the wire without injury to the lining, but at the same time it must not be so loose as to require extensive distortion for compressing it into engagement with the wire. The gripping material in the sleeve is originally in the form of a lining consisting of or containing particles of a hard and strong material, such as "Nichrome" or porcelain. Any strong material which is sufficiently hard to cut into the material of the sleeve and material of the wire when forced under pressure can be used.

The lining of gripping material is sufficiently brittle to become discontinuous and to provide fragments 13 or areas of hard particles which cut in and embed themselves in the wall of the sleeve and in the wire when the sleeve is compressed upon the wire. The mechanical affixing effect provided thereby is diagrammatically illustrated in Fig. 4.

When a sleeve is located in its ultimate position on a wire, it is compressed by a tool intended for that purpose and by which the necessary amount of pressure may be applied to the exterior of the sleeve. This tool is provided with a pair of crescent jaws by which successive pairs of areas 14 and 15 can be compressed in the sleeve as illustrated in Fig. 4. In this figure the sleeve is illustrated as having been compressed in five different locations along its axis. A sleeve of this type can be made to provide such a gripping force upon a wire as to prevent disengagement of the wire from the sleeve by a pull closely approaching the maximum tensile strength of the wire without impairing the strength of the wire.

The pipe illustrated in Fig. 1 shows the employment of two of these holding members 16 and 17 secured to the ends of the wire winding 18 and to the exterior of the metallic portion of the core of the pipe. The metallic portion of the core of the pipe includes a relatively light steel tube 19 which may be fabricated from a spirally-welded strip or from a rolled plate having a longitudinal seam, as desired. Fastened to the ends of the tube and constituting part of the core are steel end rings 20, 21 which serve as joining members between pipes. These end rings are of heavier metal than the metal contained in the steel tube and take care of the stresses at the pipe joints. Each end ring is welded to the tube at their lines of contact entirely around the pipe, so that together with the tube the end rings provide an imperforate steel wall extending from end to end of the pipe. The wire winding can terminate or be affixed to any part of the core, i. e., to the steel tube or to the end rings.

The interior of the steel wall is lined with a layer of concrete or cement 22 which may be applied in any desired manner, as by centrifugal casting. For high pressure pipes, particularly, the wrapping 18 consists of high carbon steel of high tensile strength. This wrapping may be applied by rotating the core as a mandrel and winding the wire about the pipe in a helical manner while under tension.

The tensioned winding of the wire is begun after a holding member at one end of the wire is secured to the core. This is done by a connection of fused metal between the holding member and the core. While brazing may be suitable in some cases, I prefer joining the holding members to the core by weld metal. When one end of the tensioned wire is thus secured, the wrapping proceeds until completed. At the completion of the winding operation, another gripping sleeve, which had been threaded onto the wire prior to tensioning and winding, is secured to the wire and is welded to the core while the wire is still under tension. This latter sleeve may have been initially left loose on the wire and compressed thereon just previous to the welding operation, or its final position on the wire may have been predetermined and then compressed into gripping engagement with the wire before the tensioned wire winding was begun. The pitch of the wire wrapping depends upon the amount of stress each turn of the wire is intended to take per unit length of the pipe. The pitch may vary at the ends of the pipe and the last few turns at the ends of the pipe may be made to overlie the end rings, if desired. However, if the end rings are constituted of sufficiently heavy material the ends of the wire can be terminated at their edges as in Fig. 1, or short of their edges in the manner illustrated in Fig. 13.

After completion of the winding and its anchoring to the core, the unused portion of wire is removed and the pipe is ready for any finishing operation desired. Preferably it is coated with a layer of concrete or cement sufficiently deep to embed and protect the wire wrapping from corrosion or physical injury. Such coverings are illustrated in Figs. 17, 18, 19 and 20.

The tensioned wrapping imparts compression to the metallic core or wall and also to the concrete lining 22 and by virtue of these stresses the metallic tube is anchored to and frictionally secured to the concrete lining.

While various machines are available for winding wire about a pipe, I preferably employ a machine by which the desired stress of the wire may be closely maintained during the entire winding or wrapping operation. One form of machine capable of accomplishing this is generally illustrated in Fig. 5, and I shall describe so much of its operation as is necessary to understand my method of assuring a desired tension in the wire wrapping.

The core is first mounted in place upon rollers on which it can be freely rotated. The wire 23 is taken from a supply reel 24 and around a guide or post 25. A holding device 26 in the form of a steel sleeve, such as hereinabove described, is slipped onto the wire and is positioned at a point thereon distant from its free end at 27 which is approximately equal to the elongation of the wire which occurs during wrapping under tension. This distance can be determined by trial or by computation.

The free end of the wire is then passed through a guide member 28 which is mounted upon and travels with carriage 29 of the wrapping machine. The guide member 28 may be an eye or in the form of a U, as shown. The free end of the wire is then temporarily attached to the core, as by attachment to its supporting runner ring 30. A means of attaching the end of the wire is illustrated in Figs. 6 and 7. The wire is passed through a hole in the runner ring and is engaged by a pair of spaced brackets 32, 33 having holes through which a tapered wedge pin 34 passes. The pin clamps the wire to the base of the brackets.

When attached in this or in a similar manner, the machine is started and the core is rotated in a counter-clockwise direction, as viewed from the lower edge of Fig. 5. Simultaneously the carriage 29 is caused to travel alongside the pipe to its other end. Preferably the pitch of the initial wrapping is the same as is intended for the final wrapping. Fig. 8 illustrates an instant in the progress of the initial wrapping and the approximate location of the holding member 26 against the pipe. No attempt is made to apply tension in the wire during this initial wrapping.

The initial wrapping is continued until it reaches the other end of the pipe. At this point in the operation, the wire is cut from the supply reel and is passed around a sheave 35 in such a manner that the lower reach of the wire leaving the sheave passes under the core. A holding device 36 is slipped over the end of the wire and then squeezed upon the wire and permanently secured to it. This holding device is then welded to the core. As shown in Fig. 9, the holding device is welded directly to the end ring 37 of the pipe but its position of attachment to the core is a matter of choice. The welding is preferably done by the use of an electric arc and, in any event, the heated area is controlled and localized so as not to heat the wire unduly.

After the weld has cooled and the welded union is complete, tension is applied to the loop of wire passing over sheave 35 by application of a pull upon cable 38. The pull may be provided by a suspended mass or by a machine provided for that purpose. In the apparatus shown in Fig. 5, cable 38 is attached to the carriage or trolley 39, upon which the sheave is mounted. Trolley 39 is mounted upon rails carried by cantilever beam 40 which is supported from carriage 29.

In the machine illustrated in Fig. 5, the tensioning mechanism is designed to apply a constant pull on the cable while at the same time taking up any slack and elongation of wire 23. This mechanism includes a pivoted beam 42 which is pivotally supported from carriage 29 at a point located beneath cantilever beam 40.

The pivoted beam carries a motor 43 which is arranged to drive a winch 44 at the floating end of the pivoted beam. The motor and the winch are so mounted upon the beam as to cause its free end to drop unless restrained from doing so by cable 38. Cable 38 is secured to trolley 39 and in the other direction it passes over sheave 45, then runs over sheave 46 and under sheave 47 to the winch 44 upon which it is wound. Sheave 47 is mounted on the pivoted beam 42 between the winch and the pivotal support of the beam and it therefore supports the beam in a floating position. The load provided by beam 42 therefore determines the tension in cable 38 and in wire 23 and this can be adjusted to any desired loading by adding to or removing weights from the beam.

With the desired tension on wire 23 and with the wire wrapping in the condition diagrammatically illustrated in Fig. 9, the machine is started in motion for wrapping the wire about the core under tension. In this wrapping operation the rotation of the care is clockwise, i. e., reverse to the initial winding, and the carriage 29 is driven alongside of the core towards the end of the core at which the wire is temporarily connected. This movement of the carriage causes sheave 35 to move alongside of the core and control the rewrapping of the wire. Fig. 10 illustrates an intermediate stage of the rewrapping operation.

As the rewrapping progresses the loop of wire 23 extending around sheave 35 will become enlarged due to the fact that the initial winding was loose and also because of the stretch in the wire resulting from the stress being applied during the rewrapping operation. This extension of the wire is taken up by the movement of sheave 35 away from the core, as illustrated by the relative positions of the sheave in Figs. 9, 10 and 11. As the length of the loop increases, cable 38 is taken up by the winch 44. Operation of the motor causes the winch to take up on the cable and draw the trolley and sheave 35 towards the unsupported end of beam 40.

Constant tension is maintained in cable 38 by the operation of motor 43 which is so controlled as to closely limit the floating movement of pivoted beam 42. The control is obtained by a switch which is so arranged that as the pivoted beam is lifted the switch will cause discontinuance of the operation of the motor. As the pivoted beam drops the switch is operated to close the motor contacts and put the motor in operation. The switch keeps the beam in a floating condition and as the force applied on cable 38 is constant, because of the fixed load of the pivoted beam, wire 23 will have a constant predetermined stress applied thereto.

The end of the rewrapping operation is illustrated in Fig. 11. The take up on the wrapped wire since it was initially attached to the core at 27 has resulted in locating the holding device 26 nearer the end of the core (Fig. 11) than was its position during the initial winding (cf. Figs. 8, 9 and 10).

I prefer that the holding device be squeezed upon the wire and thereby permanently located at the outset of the initial winding operation, and if this is done the holding device is ready to be welded in place at the end of the core or into engagement with end ring 31, Fig. 11. If the holding device was not initially squeezed upon the wire, the machine can be stopped just before the winding is completed and the holding device slid along the wire to the position desired. It is then permanently secured to the wire by squeezing it in the manner hereinbefore described. The machine is then operated to bring the holding device in contact with the core so that it may be welded thereto.

It is a matter of choice just where the beginning and terminating ends of the wire lay with respect to the ends of the core, and I have shown them as at the edges of the end rings for demonstrating purpose only. The windings may be carried on over the end rings, if desired, in which case the end rings would be compressed and strengthened thereby. This would permit the use of lighter end rings.

After the holding device 26 has been welded in place in the manner previously described, the tension upon cable 38 and wire 23 is relaxed. Then the wire is cut on the slack side of the holding device, as indicated in Fig. 12. The length of wire extending from the cut end to the temporary holding device at 27 may then be removed and discarded. At this stage the application of the tensioned winding is completed. It is to be understood that the pitch of the winding may be varied as desired and that the pitch may be variable as at the end of the core for locating the points of attachment to the core where desired.

While I prefer to employ a wrapping and rewrapping operation such as that just described, it is possible to wrap the wire upon the core during rotation of the core in one direction. In such a method the beginning end of the wire is secured to one end of the core by the use of a holding member and the wire is immediately tensioned and maintained under tension during its application to the core. When the winding reaches the other end of the core, the holding member for that end, which had previously been slipped upon the wire, is squeezed into locking relationship with the wire at its desired position and is then connected to the core by welding. The remaining portion of the wire is then removed after its tension is slackened.

In Figs. 13 and 14 I have illustrated a manner of anchoring tensioned wire which can be used when it is desired to make anchorage to a thin-walled tube. With this embodiment of the invention the holding member 40 is squeezed into gripping relationship with the wire 41. A plate 42 is brought into contact with the surface of tube 43 and welded in place. The holding member 40 is then welded to the plate 42. The use of the plate facilitates the making of a good welded connection between the relatively heavy sleeve and light-weight tubing and provides a welded area of the tube over which the pull of the wire is distributed. It is understood, however, that if the wall of the tube is heavy enough, the holding device may be welded directly thereto.

Figs. 15 and 16 illustrate the application of the invention with a concrete core 45. In this construction the wire wrapping is applied under tension, and similar technique is employed for fastening the ends of the wire to the core. Inasmuch as this pipe has no steel tube or other reinforcing, it is necessary to provide the same with steel anchors or lugs 46 which extend within the wall of the pipe. One of these anchors is located at each end of the pipe and the holding member 47 is secured to an exposed surface 48 thereof by welding. This anchoring means might be in the form of a steel ring about the pipe and embedded, save for its outer surface, in the concrete of the pipe. The tensioned wrapping about the pipe places the concrete core in compression. As in the case of the concrete lining for a core having an enclosing steel tube, compression in the concrete can be maintained while the pipe is subjected to internal fluid pressure so that the concrete will not crack under working conditions.

In Figs. 17, 18, 19 and 20 I have shown applications of my invention in the manufacture of high pressure pipes in which outlets are provided for. The pipe of Fig. 17 has a core comprising a steel tube 50 and a cementitious lining 51. A saddle plate 52 having a curvature conforming with the exterior of the core and extending part way around the core is mounted in place over the spot 53, Fig. 17, at which an outlet is desired. This saddle plate is secured in place by welded seams 54, preferably extending entirely around the plate. It is optional whether or not the outlet opening 53 is cut through the saddle plate before it is secured in place. The tensioned winding of the wire 55 may be accomplished either in an initial wrapping or in a rewrapping operation as previously described with the exception that before winding is begun a plurality of holding members are slid onto the wire in sufficient number to provide at least two in every turn of the wire which will overlie the outlet opening and come next to it. In Fig. 17, twelve of these holding members are shown. These holding members are spaced apart on the wire in pairs for distances about equal to the circumference of the core.

During the tension winding operation and just before the wire coming to the core carries a holding member into contact with the core, the rotation of the core is stopped and the first and second holding members 57 and 58 are located on the wire where they will come to the positions shown in Fig. 17 when the winding operation is continued. They are then compressed into engaging relationship with the wire and the winding operation is started up. The winding is halted again when the holding members 59, 60 can be located and secured to the wire at points thereon which will position them at opposite sides of the outlet when the winding operation is continued.

The positions of the third pair of holding members 61, 62 and of each succeeding pair of holding members is determined in like manner by a series of stopping and winding operations during which the holding members are clamped to the wire. After the last of the pairs (67 and 68) are brought to bear against the saddle plate the winding continues to the end of the core where the end-anchoring holding member is permanently connected to the core by welding. The holding members 57—68 can then be welded to the saddle plate.

The foregoing procedure can be used to affix a continuous winding to a core at turns intermediate its length without breaking the continuity of the winding.

After each of the turns adjacent the outlet spot 53 are thus securely anchored in two places the lengths of wire intermediate the holding members may be severed as at 71, 72, 73, 74, etc. The effect of the saddle plate is to reinforce the pipe at the outlet and to carry the stress of successive turns of the wire between their points of severance 71 and 72, 73 and 74, etc., at either side of the outlet and adjacent thereto. It will be understood that an outlet collar 75, Fig. 18, will be welded to the saddle plate over the outlet area 53 and within the space between the rows of holding members.

In the construction shown in Figs. 19 and 20 the saddle plate 77 is in the form of a sleeve which encircles the steel tube 78 of a pipe core. The sleeve is continuous in circumference and is welded in place along its edges 79, 80. The opening 81 is located at the outlet.

The encirclement of the core by a saddle sleeve makes it possible to dispense with wire wrapping over the entire width of the sleeve. The finished pipe has two complete wrappings 82 and 83. These may be made from a single tension wrapping operation with the holding members 84 and 85 located and secured in place in the manner described in the making of the pipe shown in Figs. 17 and 18 should the size of the pipe and the work involved justify the removal of the turns of wire between the ends 86 and 87.

As an alternative method each winding 82 and 83 may be applied as individual wrappings with the holding members 84 and 85 secured to the wire and to the saddle sleeve as end anchoring members of each winding in accordance with one of the winding methods herein described, the other end of each winding having a terminus on the end ring at the respective ends of the pipe. As shown in Fig. 20, the opening 81 in the saddle has been cut and there remains to be done the cutting through of the steel tube 78 and concrete lining 88. An outlet sleeve similar to sleeve 75, Fig. 18, may be applied in the shop or when needed. In the finished pipe the exterior of the core is preferably covered with a material 89 to protect the winding, such as mortar or a bituminous preparation.

What is claimed is:

1. A reinforced concrete pipe comprising, in combination, a metallic core, a concrete lining on the inside of said core, a tensioned wire helically wound about said metallic core, the tension in said wire being of such magnitude as to place said metallic core and concrete lining under compression, a steel member mechanically attached to each end of said wire wrapping, and a fused metallic connection between each of said steel members and said metallic core for securely anchoring the ends of said tensioned wire of said wrapping to said core.

2. A reinforced concrete pipe comprising, in combination, a core including a steel tube and an end ring secured to each end of said steel core, a concrete lining within said tube and end rings, a wrapping of tensioned wire about said core having ends terminating at the respective end rings, means for anchoring the ends of said tensioned wire of said wrapping to said end rings, each of said anchoring means comprising a steel sleeve surrounding a length of said wire and having a lining of gripping material, said sleeve being compressed upon said wire and unions of fused metal between said sleeve and said core.

3. A reinforced concrete pipe comprising, in combination, a pipe core including a steel tube over and enclosing a concrete interior, a tensioned wire wrapping about said steel tube, and means for securing said tensioned wire wrapping in place about said steel tube comprising steel sleeves lined with gripping material, each of said sleeves surrounding a length of said wire and being tightly compressed upon said wire and fused metallic connections between said sleeves and the steel tube.

4. A reinforced concrete pipe comprising in combination a concrete core, a tensioned wire helically wound about said concrete core, steel sleeves provided with gripping material for mechanically securing one of said sleeves to each end of the tensioned wire of said wrapping, steel anchoring means carried by said concrete core, and fused metallic connections between said steel anchoring means and each of said steel sleeves for fixedly holding the ends of said tensioned wire with respect to said core.

5. A reinforced concrete pipe comprising, in combination, a concrete tube, a tensioned wire wrapping about said tube, metallic members embedded in the body of said tube, said metallic members having portions partially exposed on the exterior of said tube adjacent the ends of the wire wrapping, and holding members mechanically affixed to the ends of the tensioned wire of said wrapping and connected to said metallic members by connections of fused metal between said holding members and said metallic members at the ends of said tensioned wire wrapping.

6. A reinforced concrete object comprising, in combination, a concrete body, a tensioned wire wrapping about said body, metallic members embedded in said concrete body, said metallic members having portions partially exposed on the exterior of said concrete body adjacent the ends of the tensioned wire of said wrapping, holding members provided with gripping material for securing the holding members to the wire, and connections of fused metal between said holding members and said metallic members at the ends of said tensioned wire wrapping.

7. A reinforced concrete object comprising, in combination, a concrete body, a tensioned wire wrapping about said body, holding members mechanically affixed to the ends of the tensioned wire, and means carried by the concrete body and to which said holding members are secured by fused metallic connections, whereby the concrete body wrapped by said tensioned wire wrapping is subjected to compressional stress intermediate said holding members.

8. In a reinforced concrete pipe having a metallic tube lined with concrete, the combination comprising a saddle overlying a portion of the exterior of said metallic tube, tensioned wires extending from one side of said saddle around the tube to the other side of said saddle, and means securing the ends of said wires to the saddle, said means comprising steel holding members with gripping material between their inner surfaces and the wire for causing adherence between the holding members and wire, and connections of fused metal between the holding members and saddle, whereby said wires are maintained in a state of tensile stress intermediate the holding members.

9. A reinforced concrete pipe comprising in combination, a pipe core comprising a steel tube and a concrete lining, a saddle covering a portion of the area of said tube intermediate its ends, means for maintaining said tube and concrete lining under compression, said means including tensioned wire and a plurality of holding members for securing the ends of said tensioned wire to the pipe core, said tensioned wire being wound about said pipe core and over said saddle and secured to said saddle by some of said holding members, and fused metallic connections between the latter of said holding members and saddle and between the holding members at the ends of said wire and said tube.

10. In combination, a body, a tensioned wire wrapping about said body, holding members comprising sleeves having linings of gripping material compressed onto and mechanically affixed to the wire at its ends, and means carried by said body and to which said holding members are secured by fused metallic connections, whereby the body wrapped by the tensioned wire wrapping is subjected to compressional stress.

11. In a method of wrapping a wire around a pipe, the steps comprising securing a steel holding member to one end of a wire, securing another steel holding member to the wire at a point in its length at which the wire will terminate when wrapped about the pipe, welding the first secured of said holding members to the pipe at one of its ends, applying tension to said wire and wrapping the tensioned wire about the pipe, securing the remaining holding member to the pipe by welding while maintaining the wire stressed, slackening the tension in the wire beyond the last-made weld, and severing the untensioned portion of the wire and thereby leaving a tensioned wire wrapping about the pipe.

12. In the method of wrapping a wire around a pipe, the steps comprising securing a steel holding member to the wire at a predetermined distance from one of its ends, temporarily attaching said end of the wire to the pipe adjacent one end of the pipe, wrapping the wire about the pipe while causing the wire to travel lengthwise of the pipe towards its other end, leaving a loop in the wire at the end of the wrapping and securing a second steel holding member to the wire at the free end of the loop, welding said second holding member to the pipe, applying tension to the wire by pulling on the loop and rewrapping the wire about the pipe under tension while guiding the loop to the starting end of the pipe and thereby laying a helix of tensioned wire about the pipe, concluding the rewrapping of the wire under tension when the initially applied holding member comes into contact with the pipe, welding said initially applied holding member to the pipe, then relaxing the tension on the loop of wire and thereafter removing the loop of wire from the pipe beyond said initially applied holding member.

13. In the method of wrapping a wire around a pipe, the steps comprising placing a steel holding member on a wire, temporarily attaching the wire to the pipe adjacent one end of the pipe, wrapping the wire about the pipe while causing the wire to travel lengthwise of the pipe towards its other end, leaving a loop in the wire at the end of the wrapping and securing a second steel holding member to the wire at the free end of the loop, welding said second holding member to the pipe, applying tension to the wire by pulling on the loop and rewrapping the wire about the pipe while under tension by causing the loop to travel back to the starting end of the pipe and thereby laying a helix of tensioned wire about the pipe, securing said initially placed holding member to the wire, welding said initially placed holding member to the pipe, then relaxing the tension on the loop of wire and thereafter removing the loop of wire from the pipe beyond said initially placed holding member.

14. A reinforced pipe comprising a wire-wrapped metallic core, said wire wrapping being under tensile stress and fastened to said core by anchoring means attached to each end of said wire wrapping and each of said anchoring means comprising a metallic sleeve surrounding and compressed upon a portion of said wire in gripping relationship therewith, and fused metallic connections between said sleeves and core whereby the wire wrapping is fastened to the core under tension and its wrapping tension is maintained.

15. A reinforced pipe comprising a metallic tube, rings surrounding said tube in spaced relation to each other and welded thereto, a tensioned wire wrapping about said tube and extending from one of said rings to another, means for anchoring said tensioned wire winding to said rings, said anchoring means comprising a plurality of metallic sleeves opposite said rings and surrounding and compressed upon different lengths of said wire in gripping relationship therewith and secured to said rings by fused metallic connections whereby tension is maintained in said wire between said rings.

16. A reinforced pipe comprising a metallic tube, a pair of rings surrounding said tube in spaced relation to each other and welded thereto, a saddle member against the outside of said tube intermediate said rings, a tensioned wire wrapping about said tube and extending between said rings and overlying said saddle member, and means for anchoring said tensioned wire wrapping to said rings and saddle member, said anchoring means comprising a plurality of steel members mechanically attached to portions of said wire, and fused metallic connections between said rings and saddle member and such of said steel members as are opposite said rings and saddle member, respectively, whereby tension is maintained in said wire wrapping.

17. A reinforced pipe comprising a metallic tube, a saddle member against said tube intermediate its ends, tensioned wire wrappings about said tube and with a portion of each overlying portions of said saddle member, and means for anchoring said tensioned wire wrappings to said tube and saddle member, said anchoring means comprising steel members mechanically attached to portions of said tensioned wire at portions thereof overlying said saddle member and said tube, and fused connections between said steel members and said saddle member and tube, respectively, whereby tension is maintained in said wire wrappings.

PHILIP R. HIRSH.